US005598166A

United States Patent [19]
Ishikawa et al.

[11] Patent Number: 5,598,166
[45] Date of Patent: Jan. 28, 1997

[54] MOBILE OBJECT POSITIONING SYSTEM

[75] Inventors: Seiji Ishikawa, Aichi-gun; Yoshihisa Suwa, Nishio; Takeshi Ito, Toyota; Tomio Yasuda, Kariya, all of Japan

[73] Assignee: Aisin Seiki Kabushiki Kaisha, Kariya, Japan

[21] Appl. No.: 626,722

[22] Filed: Apr. 1, 1996

[30] Foreign Application Priority Data

Mar. 30, 1995 [JP] Japan .................................. 7-074237

[51] Int. Cl.$^6$ .............................. H04B 7/185; G01S 5/02
[52] U.S. Cl. ........................................ 342/357; 364/449.7
[58] Field of Search .............................. 342/357; 364/449

[56] References Cited

U.S. PATENT DOCUMENTS

| 4,731,613 | 3/1988 | Endo et al. . | |
| 5,416,712 | 5/1995 | Geier et al. | 364/450 |
| 5,525,998 | 6/1996 | Geier | 342/357 |
| 5,527,003 | 6/1996 | Diesel et al. | 244/195 |

FOREIGN PATENT DOCUMENTS 61-137009 of 1986 Japan .
526680 of 1993 Japan .

Primary Examiner—Theodore M. Blum
Attorney, Agent, or Firm— Sughrue, Mion, Zinn, Macpeak & Seas

[57] ABSTRACT

A mobile object positioning system includes a GPS signal receiver for receiving positioning radio signals from a plurality of satellites, calculating a present location of a mobile object in accordance with the positioning radio signal and outputting present location data at each of a plurality of calculating times. An electronic controller is provided for updating the present location data at each calculating time, storing the present location data, estimating an error of the present location data in accordance with the positioning radio signals and outputting error data at each estimating time. A vehicle velocity sensor is disposed on the mobile object for detecting the velocity of the moving mobile object and outputting a mobile velocity signal. The electronic controller determines a stationary condition of the mobile object in accordance with the mobile velocity signal and prohibits updating the present location data when a stationary condition of the mobile object is determined and a value of the error data at a present estimating time is larger than that at a last previous estimating time.

4 Claims, 6 Drawing Sheets

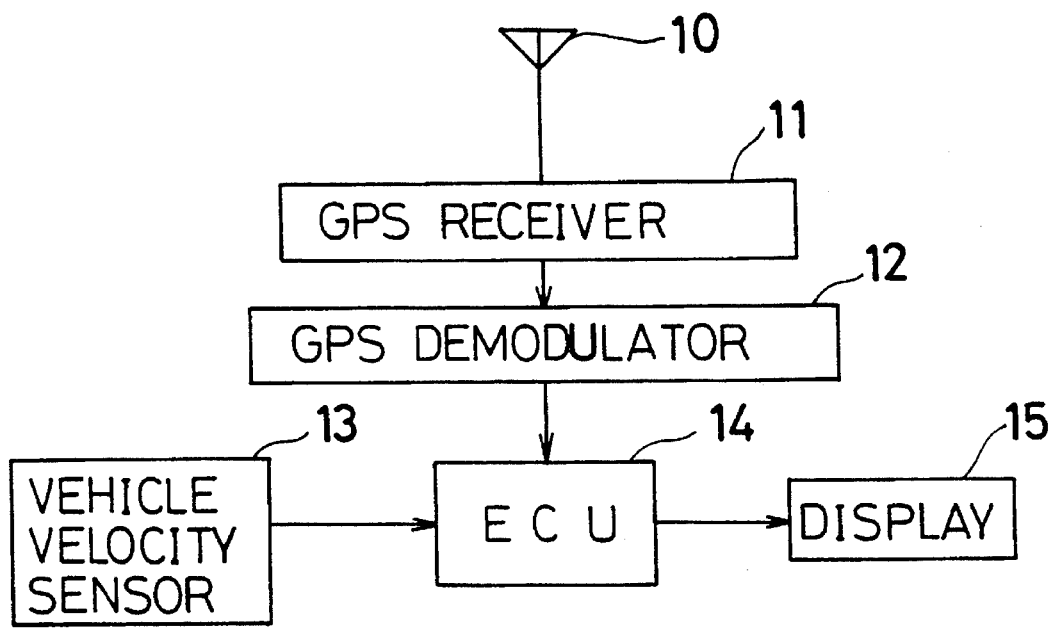

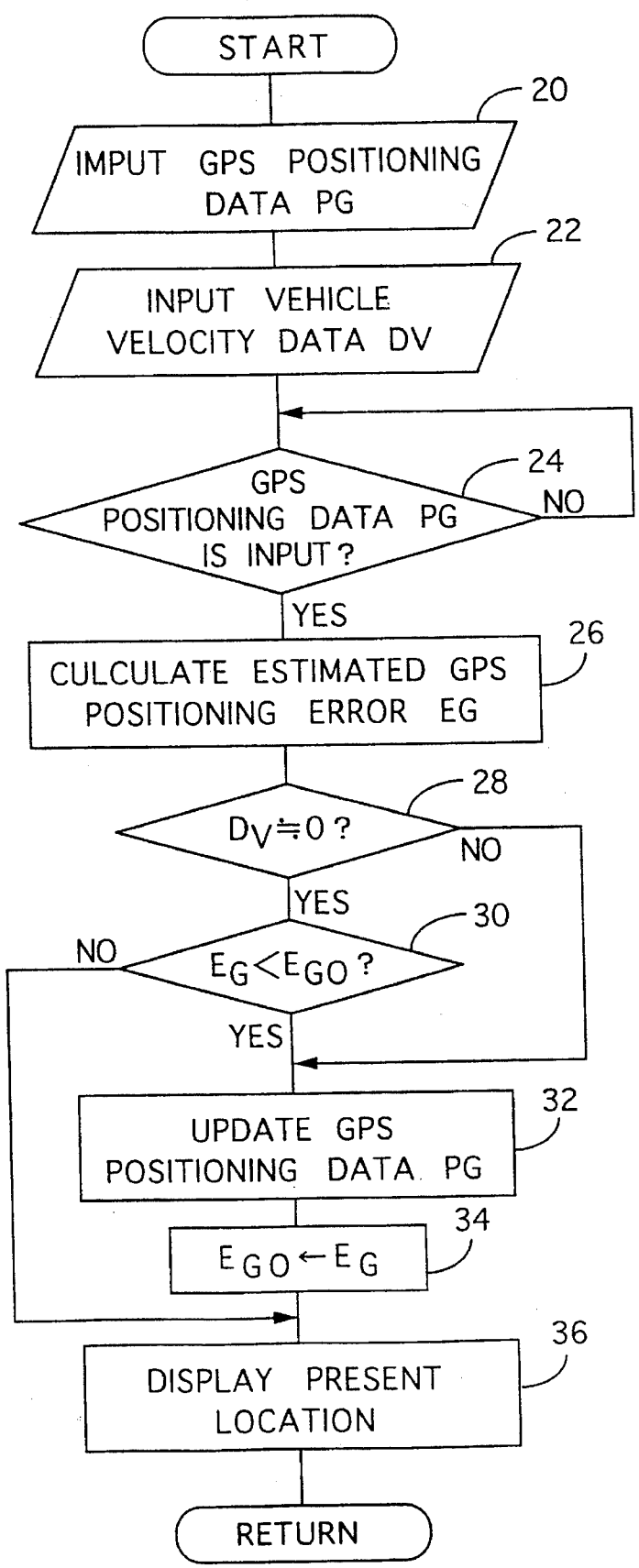

○ SECOND EMBODIMENT

▽ FIRST PRIOR ART

MOBILE OBJECT POSITIONING SYSTEM

FIELD OF THE INVENTION

The present invention relates to a mobile object positioning system. More specifically, the system utilizes signals from a Global Positioning System (GPS).

BACKGROUND OF THE INVENTION

Conventional mobile object positioning systems for positioning a vehicle, an airplane, a ship and the like use GPS signals.

A first prior art mobile object positioning system updates present location data and outputs the location data. The mobile object positioning system comprises a GPS receiver for receiving positioning radio signals from a plurality of satellites, GPS positioning means for calculating present location data of a mobile object from the radio signals and outputting the present location data at each calculating time and present location memory means for updating the present location data at each calculating time and storing the data.

This first prior art mobile object positioning system updates the present location data when the mobile object is in a stationary condition. Therefore, the present location data calculated by the GPS positioning means of the conventional mobile object positioning system is sometimes varied by various error factors when the mobile object is in the stationary condition.

A second prior art mobile object positioning system which is able to prevent the present location data from being varied is disclosed in Japanese Patent Laid-Open No. 5 (1993)-26680. This second prior art mobile object positioning system comprises GPS signal receiving means for receiving positioning radio signals from a plurality of satellites, GPS positioning means for calculating present location data of a mobile object from the positioning radio signals and outputting the present location data at each calculating time, present location memory means for updating the present location data at each calculating time and storing the present location data, mobile velocity detecting means disposed on the mobile object for detecting a velocity of the mobile object and outputting a mobile velocity signal and update prohibition means for determining a stationary condition of the mobile object in accordance with the mobile velocity signal and for prohibiting updating of the present location data when the mobile object is in a stationary condition.

However, since the second prior art mobile object positioning system disclosed in the Japanese Publication always prohibits updating the present location data when the mobile object is in a stationary condition, the present location data may become extremely incorrect when the present location data calculated at a time when the mobile object is stopped varies greatly from the real position. Therefore, the present location data is not precise when the mobile object is in a stationary condition.

Further, a locus of the location of the mobile object becomes unnatural when the mobile object starts moving. Furthermore, it takes too much time for the conventional mobile object positioning system to output the precise present location data.

SUMMARY OF THE INVENTION

It is an object of the present invention to provide a mobile object positioning system which outputs the precise present location data when the mobile object is in a stationary condition.

It is another object of the present invention to provide a mobile object positioning system which prevents the present location data from being varied.

It is a further object of the present invention to provide a mobile object positioning system which is simple in structure and small in size.

It is a further object of the present invention to provide a mobile object positioning system which has durability.

It is a further object of the present invention to provide a mobile object positioning system which is low in cost and inexpensive to manufacture.

It is a further object of the present invention to provide a mobile object positioning system which is simple to manufacture.

To achieve the above mentioned objects, the mobile object positioning system in accordance with the present invention comprises GPS signal receiving means for receiving positioning radio signals from a plurality of satellites, GPS positioning means for calculating a present location of a mobile object in accordance with the positioning radio signals and outputting present location data at each calculating time, present location memory means for updating the present location data at each calculating time and storing the present location data, error data estimating means for estimating an error in the present location data in accordance with the positioning radio signals and outputting error data at each estimating time, mobile velocity detecting means disposed on the mobile object for detecting the velocity of the mobile object and outputting a mobile velocity signal and update prohibition means for determining a stationary condition of the mobile object in accordance with the mobile velocity signal and for prohibiting updating the present location data when the stationary condition of the mobile object is determined and a value of the error data of the present estimating time is larger than that of the last estimating time.

BRIEF DESCRIPTION OF THE DRAWINGS

The features and advantages of the mobile object positioning system according to the present invention will be more clearly appreciated from the following description in conjunction with the accompanying drawings wherein:

FIG. 1 is a block diagram showing a first embodiment of a mobile object positioning system of the present invention;

FIG. 2 is a flow chart of a mobile object positioning system of FIG. 1;

FIG. 3 is a diagram explaining the operation of present location data calculated by a first embodiment of a mobile object positioning system when a mobile object is stationary;

DETAILED DESCRIPTION OF THE INVENTION

Figure 4:
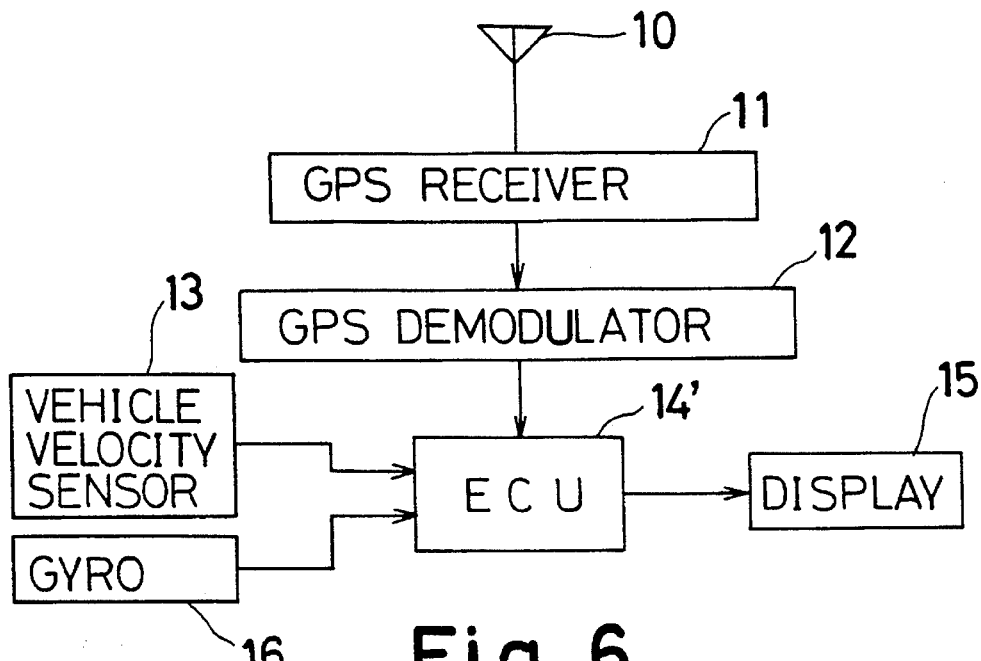
FIG. 4 is a block diagram showing a second embodiment of a mobile object positioning system of the present invention.

A mobile object positioning system for installation on a vehicle is shown in FIG. 1. With reference to FIG. 1, the mobile object positioning system comprises a GPS antenna 10, a GPS receiver 11, a GPS demodulator 12, a vehicle velocity sensor 13, an electronic controller 14 and a display 15.

Each of a plurality of satellites sends a radio signal of 1.57542 GHz. The radio signal includes precise time data, formula data of satellite locus and data showing accuracy of the time and the formula data of satellite locus. A location of the satellite can be determined on earth in accordance with the time data and the formula data of the satellite locus. Further, a distance between the satellite and a receiving point on earth can be determined in accordance with the time difference between the satellite and the receiving point (a delay time for transmitting the radio signal).

The GPS receiver 11 receives a radio signal from each of the satellites through the GPS antenna 10 and outputs the signals to the GPS demodulator 12. The GPS demodulator 12 demodulates the data for the precise time, the formula data for the satellite locus and its accuracy. The GPS demodulator 12 sends the data to the electronic controller 14.

The vehicle velocity sensor 13 generates pulse signals according to a rotational speed of a rotating member of the vehicle and sends the pulse signals to the electronic controller 14. The vehicle velocity sensor 13 is formed with a magnet (not shown) disposed on an output shaft of a transmission or a shaft synchronously rotating with the output shaft and a lead switch (not shown) disposed near the magnet so as to open and close the lead switch according to the rotation of a vehicle wheel. The display 15 displays the present location of the vehicle or the like in accordance with data from the electronic controller 14.

The electronic controller 14 includes a microcomputer (not shown) therein so as to calculate the present location of the vehicle in accordance with the radio signals from the satellites.

The operation of the microcomputer will be described hereinafter with reference to FIG. 2. At Step 20, GPS positioning data PG is input to the microcomputer from the GPS receiver 11 at each calculating time. At Step 22, vehicle velocity data DV is input to the microcomputer from the vehicle velocity sensor 13 at each calculating time.

At Step 24, the microcomputer determines whether the GPS positioning data PG is input to the microcomputer or not. When the GPS positioning data PG is not input to the microcomputer, the program returns. When the GPS positioning data PG is input to the microcomputer, an estimate GPS positioning error EG is calculated by equation (1) at Step 26.

$$EG=(PDOP) \times (UERE) \tag{1}$$

PDOP correspond to an error caused by an arrangement of each of the satellites. UERE does not correspond to the error caused by the arrangement of each of the satellites but corresponds to another error caused by an internal condition of each of the satellites (e.g. an error in the time of a clock installed on the satellite or an error in an estimated satellite locus).

At Step 28, the microcomputer determined whether the vehicle is stationary or not in accordance with the vehicle velocity data DV. That is to say, the microcomputer determines whether the vehicle velocity data DV is approximately 0 or not.

When the vehicle is stationary, the microcomputer determines whether the estimated GPS positioning error EG (calculated by the equation (1) at the present time is less than the estimated GPS positioning error EGO of the last time at Step 30. When the present estimated GPS positioning error EG is smaller than the last estimated GPS positioning error EGO, the GPS positioning data PG is updated at STEP 32. Further, the last estimated GPS positioning error EGO is updated by the present GPS estimated positioning error EG at Step 34. Finally, after the renewed present location of the vehicle is displayed on the display 155 at Step 36, the program returns to Step 20.

At Step 28, when the microcomputer determines that the vehicle is not stationary, the GPS positioning data PG is updated at Step 32. Further, the last estimated GPS positioning error EGO is updated by the present estimated GPS positioning error EG at Step 34. Finally, after the renewed present location of the vehicle is displayed on the display 15 at Step 36, the program returns to Step 20.

When the microcomputer determines that the vehicle is stationary at Step 28 and determines that the present estimated GPS positioning error EG is larger than the last estimated GPS positioning error EGO, the microcomputer prohibits updating the GPS positioning data PG. At this time, the microcomputer also prohibits updating the last estimated GPS positioning error EGO. Finally, the last GPS positioning data PG is displayed on the display 15 at Step 36.

An operation of the first embodiment of the mobile object positioning system will be described hereinafter with reference to FIG. 3 showing the location of the vehicle which is stationary. In FIG. 3, it is assumed that the estimated GPS positioning error EG1 calculated the first time after the vehicle stops is greater than those positioning errors EG3–5 calculated the third to fifth times, the estimated GPS positioning errors EG3–5 of the third to fifth times after the vehicle stops are greater than those positioning errors EG7, 8 calculated the seventh and eighth times, the estimated GPS positioning errors EG7, 8 of the seventh and eighth times after the vehicle stops are greater than that positioning error EG2 calculated the second time after the vehicle stops, and the estimated GPS positioning error EG2 of the second time after the vehicle stops is greater than positioning error EG6 calculated the sixth time after the vehicle stops.

In accordance with FIG. 3, when the present estimated GPS positioning error EG (EG2 and EG6) is less than the last estimated GPS positioning error EGO, the GPS positioning data PG is updated. Therefore, although the GPS positioning data PG calculated the first time after the vehicle stops is considerably different from the real value PT of the GPS positioning data PG, the GPS positioning data PG slowly approaches the real value PT.

On the contrary, when the present estimated GPS positioning error EG (EG1, EG3 to EG5, EG7 and EG8) is larger than the last estimated GPS positioning error EGO, the GPS positioning data PG is prohibited from updating. Therefore, needless variations of the GPS positioning data PG can be prevented from being generated.

In accordance with the second prior art discussed above, the GPS positioning data PG is always prohibited from updating when the vehicle is stationary. Therefore, the GPS positioning data PG become extremely incorrect when the GPS positioning data PG calculated the first time is considerably different from the real value PT.

In accordance with the first prior art discussed above, the GPS positioning data PG is always updated when the vehicle stays. Therefore, the GPS positioning data PG is sometimes varied when the vehicle is stationary.

As shown in FIG. 3, reference PT represents the real location of the vehicle in a stationary condition. References P1, P2, P3'–P5', Pg, P7' and P8' represent the GPS positioning data for the vehicle which are input to the microcomputer from the GPS receiver 11. References P3–P5, P7 and P8 represent the GPS positioning data which are not renewed and displayed on the display 15 because the estimated GPS positioning errors are greater than the positioning error calculated the last time.

When the GPS receiver calculates GPS positioning data for the first time when the vehicle goes into the stationary condition, the first GPS positioning data is indicated by reference P1. The square mark in FIG. 3 represents the first GPS positioning data according to the first embodiment of the present invention. The inverted triangle represents the first GPS positioning data of the first prior art example and the upright triangle represents the first GPS positioning data of the second prior art example.

The GPS receiver in the second prior art example does not renew the positioning data while the vehicle remains in a stationary condition and the GPS positioning data stays at the same position as indicated by the upright triangle. In a predetermined period of time, the GPS receiver in the first embodiment and the first prior art calculates the second GPS positioning data as indicated by reference P2. However, in the first embodiment, the estimated positioning error is smaller than that of the first time, the GPS positioning data is renewed to the calculated positioning data as indicated by the reference P2.

For the third time of calculation, the third GPS positioning data of the first prior art is indicated by the inverted triangle at P3'. On the other hand, the third GPS positioning data P3 of the first embodiment remains at the same position as the previous positioning data of P2, because the estimated GPS positioning errors are greater than that of the second time. Note that the error becomes smaller as the position gets closer to the real position of PT.

Until the sixth time of the calculation, the first embodiment does not renew the positioning data P3–P5 and remains at the same position at P2. The GPS receiver of the first prior art always renews the positioning data as indicated by the references P3', P4' and P5'.

With reference to FIG. 4, a second embodiment of the mobile object positioning system is provide with a piezoelectric vibration gyro 16 which is additional to the first embodiment. The piezoelectric vibration gyro 16 is installed on a vehicle and outputs an analogue signal in relation to the yaw rate ω of the vehicle about a vertical axis to the electronic controller 14' (described in detail later). The piezoelectric vibration gyro 16 is able to output a signal with a voltage of 0 to 5 V. When the vehicle rotates in the right direction, the piezoelectric vibration gyro 16 outputs a signal with a voltage larger than 2.5 V. When the vehicle rotates in the left direction, the piezoelectric vibration gyro 16 outputs a signal with a voltage less than 2.5 V. An altitude sensor which outputs an analogue signal according to the altitude may be installed in the second embodiment of the mobile object positioning system.

The electronic controller 14' includes a microcomputer (not shown). The electronic controller 14' combines the GPS positioning data PG in accordance with radio signals from the satellites and the self positioning data PD in accordance with signals from the vehicle velocity sensor 13 and the piezoelectric vibration gyro 16 in order to locate the position of the vehicle on which the mobile object positioning system is installed.

Figure 5:
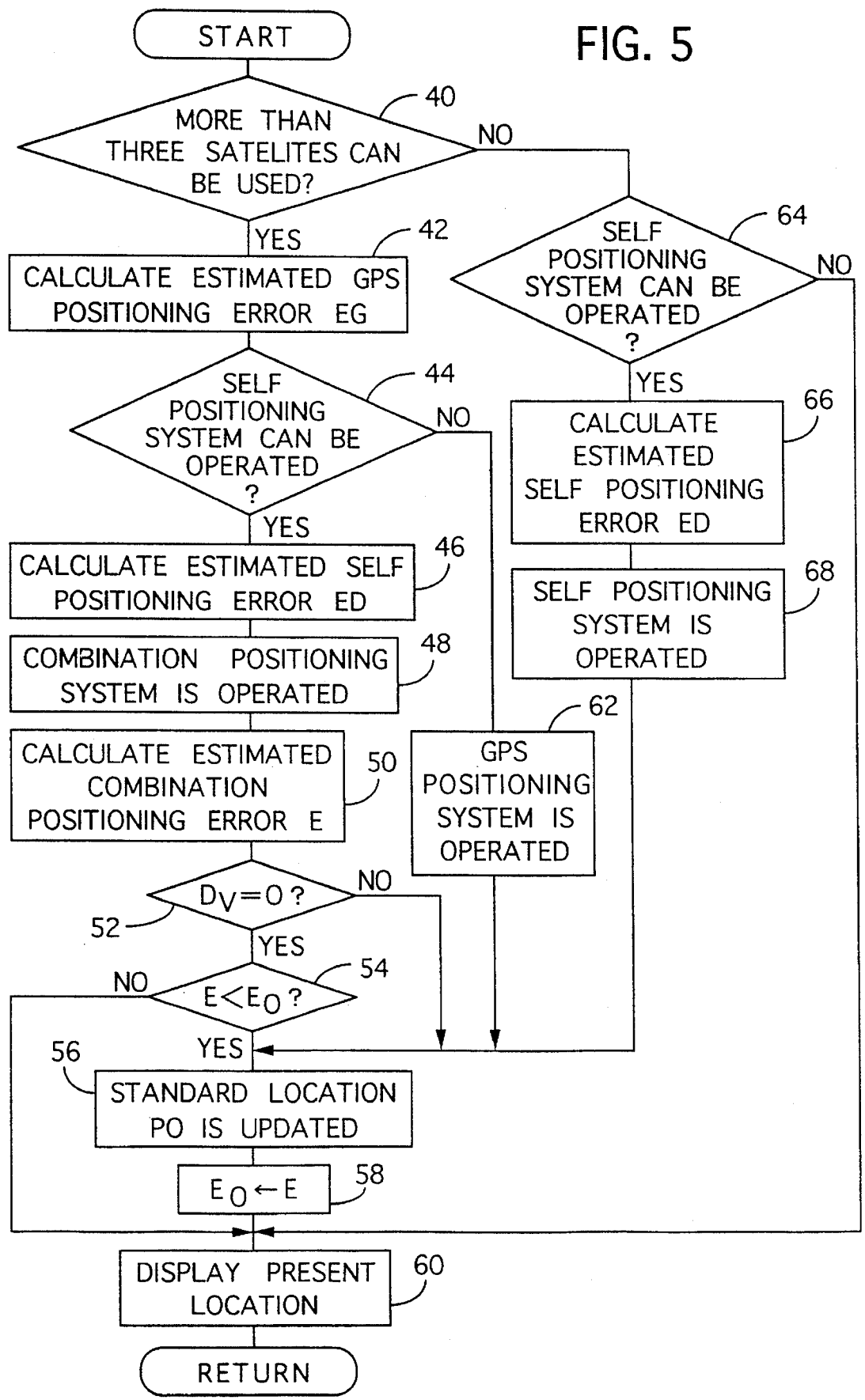
FIG. 5 is a flow chart of a mobile object positioning system of FIG. 4.

With reference to FIG. 5, the operation of the microcomputer will be described hereinafter. At Step 40, the microcomputer determines whether more than three satellites can be used or not. The microcomputer determines whether the radio signals of more than three satellites are demodulated or not. When more than three satellites can be used, the estimated GPS positioning error EG is calculated in accordance with the equation (1) at Step 42.

At Step 44, the microcomputer determines whether the self positioning system can be operated or not. The microcomputer has standard location data (the last positioning data) and last direction data. When the self positioning system can be operated, an estimated self positioning error ED is calculated in accordance with equations (2), (3) at Step 46.

$$ED = EDO + e \quad (2)$$

EDO corresponds to an estimated self positioning error of the standard location (the last location). "e" corresponds to an estimated error in the amount of moving of the vehicle calculated by the self positioning system. Further, an initial estimated self positioning error EDO corresponds to the initial estimated GPS positioning error EG.

$$e = STEP \cdot \sin \phi error + STEPerror \quad (3)$$

Figure 6:
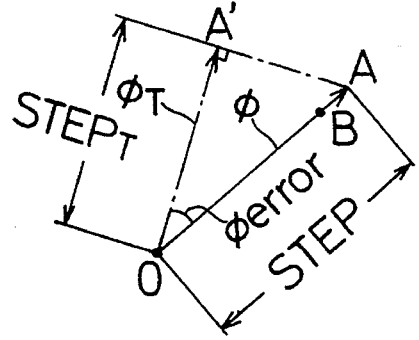
FIG. 6 is a diagram explaining an estimated error of the amount of moving of a mobile object under a self positioning system.

STEP·sin φerror corresponds to a length of a segment A—A' shown in FIG. 6 which is designed to be transformed into the distance from the estimated direction error φ error (=the present calculated direction φ–the real direction φt). STEPerror corresponds to the estimated distance summation error (the present calculated distance summation STEP–the real distance summation STEPT) corresponding to a length of a segment A-B shown in FIG. 6. STEP is calculated in accordance with the vehicle velocity data from the vehicle velocity sensor 13 and the amount of the circumference of the vehicle wheel.

At Step 48, the present location P of the vehicle is calculated in accordance with the GPS positioning data PG and the self positioning data PD.

The GPS positioning data PG is calculated by the following four equations.

$$Ax - L \quad (4)$$

When four satellites can be used, "A" corresponds to a matrix of 4×4 as shown in equation (5), "x" corresponds to a matrix of 1×4 shown as $[\Delta x \Delta y \Delta z \, c\Delta t]^T$ and "L" corresponds to a matrix of 1×4 shown as $[\Delta 11 \, \Delta 12 \, \Delta 13 \, 0]^T$.

When three satellites can be used, "A" corresponds to a matrix of 4×4 as shown in equation (6), "x" corresponds to a matrix of 1×4 shown as $[\Delta x \Delta y \Delta z \Delta c \Delta t]^T$ and "L" corresponds to a matrix of 1×4 shown as $[\Delta 11 \, \Delta 12 \, \Delta 13 \, 0]^T$.

$$A = \begin{cases} l1\ m1\ n1\ 1 \\ l2\ m2\ n2\ 1 \\ l3\ m3\ n3\ 1 \\ l4\ m4\ n4\ 1 \end{cases} \tag{5}$$

$$A = \begin{cases} l1\ m1\ n1\ 1 \\ l2\ m2\ n2\ 1 \\ l3\ m3\ n3\ 1 \\ 0\ 0\ 1\ 0 \end{cases} \tag{6}$$

Figure 7:
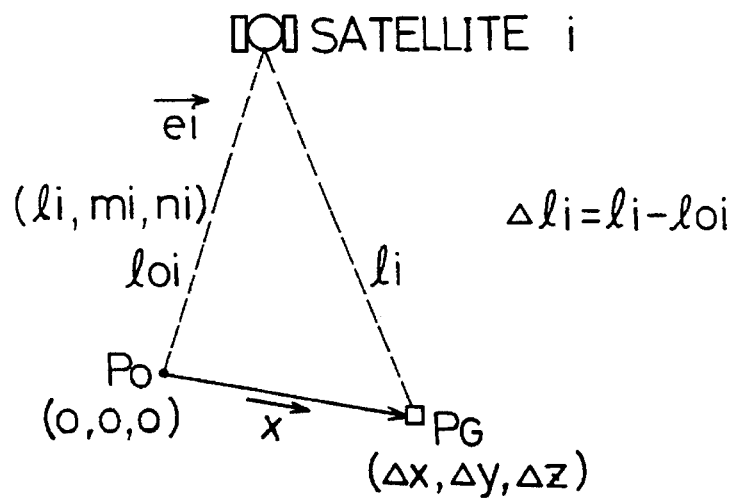
FIG. 7 is a diagram explaining the operation of a GPS system.

"li, mi, ni" are elements of vectors as shown in FIG. 7. In FIG. 7, ei=(l1 m1 n1) (i=1 to 4, "i" corresponds to the number of satellites.) corresponds to the vector which is directed to the last location PO (0,0,0) from the satellite i. The vector ei is extracted from the radio signal.

The vector x ($\Delta x \Delta y \Delta z$) which is unknown is directed to the present location PG from the last location PO. $\Delta t$ corresponds to a difference between times at which the radio signal reaches to the last location PO and at which the radio signal reaches to the present location PG from the satellite. "c" corresponds to the velocity of light.

$\Delta li$ (i=1 to 4, "i" corresponds to the number of satellites.) is shown as an equation (7). $\Delta li$ corresponds to a difference between an approximate distance li from each of the satellites to the present location PG and an approximate distance 10i from each of the satellites to the lost location PO. The approximate distances are also extracted from the radio signal.

$$\Delta li = li - 10i \tag{7}$$

The GPS positioning data PG ($\Delta x \Delta y \Delta z$) is calculated from the radio signals of more than three satellites in accordance with the equation (4) as described above.

On the other hand, the self positioning data PD is calculated in accordance with an equation (8) shown as follows. The self positioning data PD is formed to add the amount of moving distance $\Delta P$ of the vehicle (which is calculated by the signals of the vehicle velocity sensor 13 and the piezoelectric vibration gyro 16) to the last (standard) location PO.

$$PD = PO + \Delta P \tag{8}$$

Each of elements $_\delta x$, $_\delta y$ of $\Delta P$ ($_\delta x\ _\delta y\ 0$) is shown as each of equations (9).

$$\delta x = STEP \cdot \cos \theta$$
$$\delta y = STEP \cdot \sin \theta \tag{9}$$

As described above, STEP corresponds to the present calculated distance summation. $\theta$ corresponds to a rotational angle of the vehicle calculated from the yaw rate detected by the piezoelectric vibration gyro 16 (corresponding to a value which is formed to subtract the last direction from the present direction of the vehicle).

The self positioning data PD ($_\delta x\ _\delta y\ 0$) is calculated from the signals of the vehicle velocity sensor 13 and the piezoelectric vibration gyro 16 in accordance with the equations (8), (9) as described above.

Figure 8:
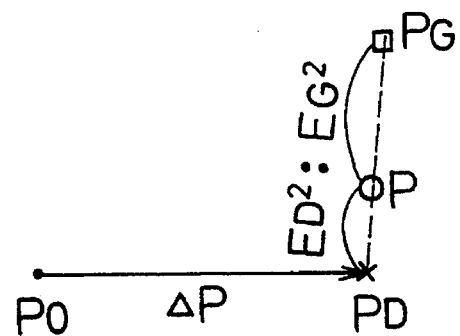
FIG. 8 is a diagram explaining the operation of a GPS system combined with a self positioning system.

A combination positioning data P is calculated by the GPS positioning data PG, the self positioning data PD, the estimated GPS positioning error ED in accordance with an equation (10) as follows. The combination positioning data P corresponds to a point which divides a segment PD-PG into $ED^2$ : $EG^2$ as shown in FIG. 8. The combination positioning data P is formed with the GPS positioning data PG and the self positioning data PD each of which is weighted in relation to each of the estimated positioning errors EG, ED in order to precisely position the vehicle location.

$$P = (ED^2 \cdot PG + EG^2 \cdot PD)/(ED^2 + EG^2) \tag{10}$$

After the combination positioning data P is calculated at Step 48, an estimated combination positioning error E is calculated by the estimated GPS positioning error EG and the estimated self positioning error ED in accordance with an equation (11) shown as follows at Step 50.

$$E = 2EG^2 \cdot ED^2/(ED^2 + EG^2) \tag{11}$$

The equation (11) satisfies a relation of E=ED=EG.

At Step 52, the microcomputer determines whether the vehicle is stationary or not. When the vehicle is stationary, the microcomputer determines whether the estimated combination positioning error E of the present time is less than the estimated combination positioning error EO of the last time at Step 54. When the present estimated combination positioning error E is less than the last estimated combination positioning error EO, the self positioning data PO is updated by the present combination positioning data P at Step 56. Further, the last estimated combination positioning error EO is updated to the present estimated combination positioning error E at Step 58. Finally, after the present combination positioning data P is displayed on the display 15 at Step 60, the program returns to Step 40.

At Step 52, when the microcomputer determines that the vehicle is not stationary, the self positioning data PO (the standard location) is updated by the present combination positioning data P at Step 56. Further, the last estimated combination positioning error EO is updated by the present estimated combination positioning error E at Step 58. Finally, after the present combination positioning data P is displayed on the display 15 at Step 60, the program returns to Step 40.

When the microcomputer determines that the vehicle is stationary at Step 54 and determines that the present estimated combination positioning error E is larger than the last estimated combination positioning error EO, the microcomputer prohibits updating the self positioning data PO. At this time, the microcomputer also prohibits updating the last estimated combination positioning error EO. Finally, after the present combination positioning data P is displayed on the display 15 at Step 60, the program returns to Step 40.

On the other hand, when the microcomputer determines that the self positioning system cannot be operated at Step 44, the GPS positioning data PG is calculated in accordance with the equation (4) at Step 62 (in the same way at Step 48). The self positioning data PO is updated by the present combination positioning data P at Step 56 later. Further, the last estimated combination positioning error EO is updated by the present estimated combination positioning error E at Step 58. Finally, after the present combination positioning data P is displayed on the display 15 at Step 60, the program returns to Step 40.

When the microcomputer determines that less than three satellites can be used at Step 40, the microcomputer determines whether the self positioning system can be operated or not at Step 64. When the microcomputer determines that the self positioning system can be operated, the estimated self positioning error ED is calculated in accordance tithe the equations (2), (3) at Step 66 (in the same way as at Step 46). The self positioning data PO is updated by the present combination positioning data P at Step 56 later. Further, the last estimated combination positioning error EO is updated by the present estimated combination positioning error E at Step 58. Finally, after the present combination positioning data P is displayed on the display 15 at Step 60, the program returns to Step 40.

When the microcomputer determines that the self positioning system also cannot be operated at Step 64, the last positioning data is output as the present location data without updating the location data at Step 60.

Figure 9:
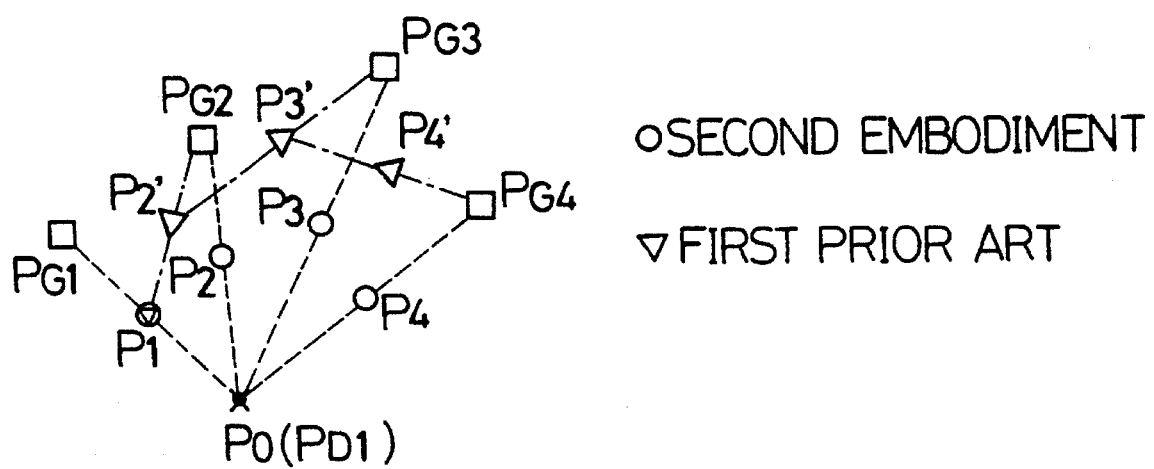
FIG. 9 is a diagram explaining the operation of the present location data calculated by a second embodiment of a mobile object positioning system when a mobile object is stationary.

An operation of the second embodiment of the mobile object positioning system will be described hereinafter with reference to FIGS. 9 to 11. FIG. 9 shows the positioning data when the standard location is not updated. As shown in FIG. 9, the variation of the combination positioning data P of the second embodiment of the present invention can be reduced in comparison with that of the first prior art example in which the combination positioning data is always updated.

In FIG. 9, PO(PD1) represents the displayed position when the vehicle is in a stationary condition. In FIG. 9, references PG1–PG4 with the squares represent the GPS positioning data calculated each time and references P1–P4 which the circles represent the display positions calculated by the combination of the position PO and the positioning data of PG1–PG4. In FIG. 9, the chart is shown when the estimated positioning errors are greater so the positioning data is not renewed in the second embodiment.

References P1, P2'–P4' with the inverted triangles represent the GPS positioning data of the first prior art example which always renews the positioning data.

For the first time calculation of the GSP positioning data PG1, both the second embodiment and the first prior art rene the positioning data to P1 which is a combination of the positioning data PO and the GPS positioning data PG1. For the second time of calculation, in the first prior art, the second positioning data P2' is calculated based on the combination of the first positioning data P1 and the GPS positioning data PG2. However, in the second embodiment, the second positioning data P2 is calculated based on the combination of the positioning data PO and the GPS positioning data PG2 because the positioning data was not renewed in the first time of calculation Positioning data P3, P3', P4 and P4' is calculated in the same manner.

Figure 10:
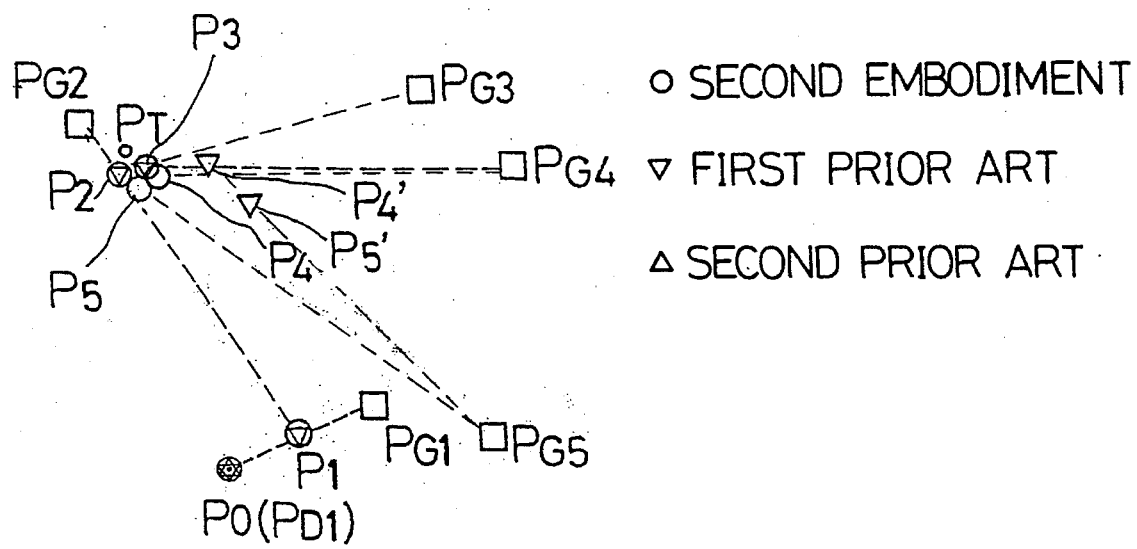
FIG. 10 is a diagram explaining the operation of the present location data calculated by a second embodiment of a mobile object positioning system when a mobile object is stationary and the estimated errors vary.

In FIG. 10, it is assumed that the estimated combination positioning error E1 calculated at the first time after the vehicle stops and the estimated combination positioning errors E3–5 calculated at the third to fifth times after the vehicle stops are greater than the estimated combination positioning error E2 calculated at the second time after the vehicle stops.

In accordance with FIG. 10, when the present estimated combination positioning error E (E2) is less than the last estimated combination positioning error EO, the last self positioning data PO (the standard location) is updated by the present combination positioning data P2. Therefore, although the combination positioning data at the first time after the vehicle stops is for from the real value PT, the combination positioning data slowly approaches the real value PT.

On the contrary, when the present estimated combination positioning error E (E1, E3 to E5) is larger than the last estimated combination positioning error EO, the combination positioning data PO is prohibited from updating. Therefore, needless variations of the combination positioning data can be prevented from being generated. Consequently, the combination positioning data P3 to P5 calculated at the third to fifth times after the vehicle stops approach the present combination positioning data P2 having the smallest estimated combination positioning error.

In accordance with second prior art example, the combination positioning data is always prohibited from updating when the vehicle is stationary. Therefore, the combination positioning data becomes extremely incorrect when the combination positioning data calculated at the first time is far from the real value PT.

In accordance with the first prior art example, the combination positioning data PO is always updated when the vehicle is stationary. Therefore, the combination positioning data is sometimes varied when the vehicle stops. Consequently, the combination positioning data P3 to P5 calculated at the third to fifth times after the vehicle stops have difficulty approaching the present combination positioning data P2 having the smallest estimated combination positioning error.

In FIG. 10, the estimated errors vary in the calculations. Reference PO or PD1 represents the position when the vehicle is in a stationary condition. Reference PT represents the real position of the vehicle in a stationary condition. References PG1-PG4 with the squares represent the GPS positioning data, references P1, P2, P3, P4' and P5' with the inverted triangles represent the positions calculated in the first prior art example and reference PO with the upward triangle represents the second prior art example. In the second prior art example, since the positioning data is not renewed when the vehicle is in a stationary condition, the position stays at the same position as indicated by the upward triangle at PO. Now, for the first time calculation in both the second embodiment and the first prior art example, the position P1 is calculated based on the combination of the position data PO and the GPS positioning data PG1 as shown in FIG. 10 by the circle and the inverted triangle. For the second time calculation, in the second embodiment, the position P2 is calculated based on the combination of the position data P1 and the GPS positioning data PG2. The estimated error of the GPS positioning data is smaller than that of the previous time so the position data is renewed to the positioning P2. For the second time calculation of the first prior art example, the position P2 is also calculated based on the combination of the position data P1 and the GPS positioning data PG2. The calculations in the second embodiment are conducted as follows:

| position | combination of | renewed |
|---|---|---|
| P1 | P0 & PG1 | yes |
| P2 | P1 & PG2 | yes |
| P3 | P2 & PG3 | no (because error E3 is greater than error E2) |
| P4 | P2 & PG4 | no (because error E4 is greater than error E2) |
| P5 | P2 & PG5 | — |

In the first prior art, calculations are as follows:

| position | combination of | renewed |
|---|---|---|
| P1 | P0 & PG1 | yes |
| P2 | P1 & PG2 | yes |
| P3 | P2 & PG3 | yes |
| P4' | P3 & PG4 | yes |
| P5' | P4' & PG5 | — |

Figure 11:
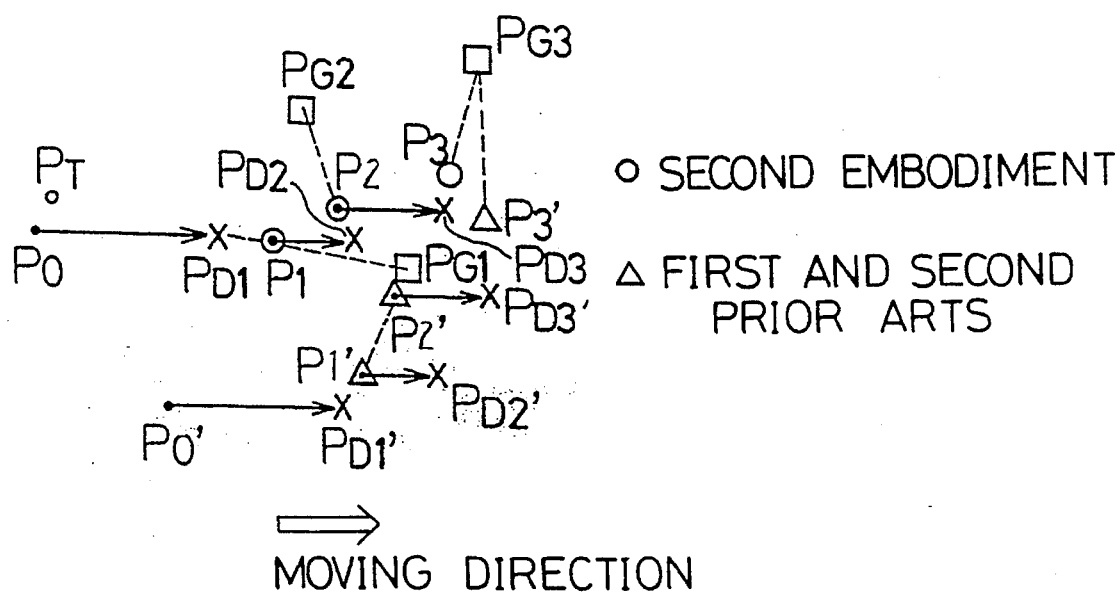
FIG. 11 is a diagram explaining the operation of the present location data calculated by a second embodiment of a mobile object positioning system when a mobile object starts moving.

In FIG. 11, the chart shows the positioning data conditions when the vehicle starts moving. Reference PT represents the real position of the vehicle. Reference PO represents the position calculated by the second embodiment of the invention just before the vehicle starts moving. Reference PO' represents the position calculated by the first prior art example just before the vehicle starts moving.

In the second embodiment the gyro detects the position PD1 and the GPS receiver detects the GPS positioning data PG1. The position P1 is calculated based on the combination of the gyro position PD1 and the GPS position PG1. At the second time the position P2 is calculated based on the gyro position PD2 and the GPS position PG2 and so forth.

In the first prior art example, the gyro detects the position PD1' when the vehicle moves from the position P0' and the GPS receiver detects the GPS positioning data PG1. The position P1' is calculated based on the gyro position PD1' and the GPS position PG1. At the second time, the position P2' is calculated based on the gyro position PD2' and the GPS position PG2 and so forth. Thus, the path of the calculated positions of the vehicle in the second embodiment shows a smoother and more natural trace than that of the calculated positions of the vehicle in the first prior art example.

While the invention has been particularly shown and described with reference to preferred embodiments thereof, it will be understood by those in the art that the foregoing and other changes in form and details may be made therein without departing from the spirit and scope of the invention.

What is claimed is:

1. A mobile object positioning system comprising:
    GPS signal receiving means for receiving positioning radio signals from a plurality of satellites;
    electronic control means connected to said receiving means for calculating a present location of a mobile object in accordance with the positioning radio signals and outputting present location data at a plurality of calculating times; and
    mobile velocity detecting means disposed on the mobile object for detecting velocity of a moving mobile object and outputting a mobile velocity signal to said electronic control means;
    wherein said electronic control means includes:
        present location memory means for updating the present location data at each calculating time and storing the present location data;
        error data estimating means for estimating an error of the present location data in accordance with the positioning radio signals and outputting error data at each estimating time; and
        update prohibition means for determining a stationary condition of the mobile object in accordance with the mobile velocity signal and for prohibiting updating the present location data when the stationary condition of the mobile object is determined and a value of the error data of a present estimating time is larger than that of a last previous estimating time.

2. A mobile object positioning system as recited in claim 1, wherein the update prohibition means prohibits updating the value of the error data of a present estimating time when the stationary condition of the mobile object is determined and the value of the error data of the present estimating time is larger than that of the last previous estimating time.

3. A mobile objecting positioning system comprising:
    GPS signal receiving means for receiving positioning radio signals form a plurality of satellites;
    electronic control means connected to said receiving means for calculating a present location of a mobile object in accordance with the positioning radio signal sand outputting present location data at each of a plurality of calculating times;
    mobile velocity detecting means disposed on the mobile object for detecting velocity of a moving mobile object and outputting a mobile velocity signal to said electronic control means; and
    mobile direction detecting means disposed on the mobile object for detecting a direction of the mobile object and outputting a mobile direction signal to said electronic control means;
    wherein said electronic control includes:
        self positioning means for calculating movement of the mobile object in accordance with the mobile velocity signal and the mobile direction signal, combining the movement of the mobile object with a standard location of the mobile object at which the mobile object was located at a last previous calculating time so as to calculate second present location data and outputting the second present location data at each calculating time;
        combination positioning means for combining the first present location data and the second present location data in order to calculate a present location of the mobile object and outputting the present location data at each calculating time;
        error data estimating means for estimating an error of the present location data in accordance with a first error of the first present location data and a second error of the second present location data and outputting error data at each estimating time; and
    update prohibition means for determining a stationary condition of the mobile object in accordance wit the mobile velocity signal and for prohibiting updating the present location data when the stationary condition of the mobile object is determined and a value of the error data of a present estimating time is larger than that at a last previous estimating time.

4. A mobile object positioning system as recited in claim 3, wherein the update prohibition means prohibits updating the value of the error data of the present estimating time when the stationary condition of the mobile object is determined and the value of the error data of the present estimating time is larger than that at the last previous estimating time.

* * * * *